United States Patent [19]

Fenton

[11] Patent Number: 5,331,152
[45] Date of Patent: Jul. 19, 1994

[54] FIBER OPTIC POSITION INDICATOR

[75] Inventor: Stephen P. Fenton, Inverurie, Scotland

[73] Assignee: ABB Vetco Gray Inc., Houston, Tex.

[21] Appl. No.: 21,708

[22] Filed: Feb. 24, 1993

[51] Int. Cl.$^5$ .................................................. H01J 5/16
[52] U.S. Cl. ............................ 250/227.11; 250/227.21
[58] Field of Search .......... 250/227.11, 227.2, 227.21, 250/214 PR; 385/12

[56] References Cited

U.S. PATENT DOCUMENTS

| | | | |
|---|---|---|---|
| 3,729,047 | 4/1973 | Bohlein | 250/227.21 |
| 4,304,630 | 12/1981 | Tanner | 250/227.21 |
| 4,438,987 | 3/1984 | Kapaan | 250/227.21 |
| 4,547,665 | 10/1985 | Little et al. | 250/227.21 |

Primary Examiner—David C. Nelms
Attorney, Agent, or Firm—James E. Bradley

[57] ABSTRACT

A sensor particularly for a valve actuator or choke for oil and gas production detects the position of an object that moves along a linear path. The sensor includes a holder with input and output fiber optic tubes extending into the holder. The ends of the fiber optic tubes locate adjacent the moving object. The moving object has a reflecting portion which will reflect light back when located in registry with the fiber optic tubes.

31 Claims, 6 Drawing Sheets

FIBER OPTIC POSITION INDICATOR

BACKGROUND OF THE INVENTION

1. Field of the Invention

This invention relates in general to sensors for indicating the open and closed position of an object, and in particular to a sensor using fiber optics.

2. Description of the Prior Art

In subsea and surface well systems, a need exists for determining the position of a moving object. For example, in a valve or a choke, a closure member, such as a gate, moves between open and closed positions. In some cases, the indication must be transmitted from the subsea well to readout equipment at the surface.

Prior art devices using proximity sensors will detect the fully closed position and the fully open position. The proximity sensor may be a Hall Effect sensor or a limit switch. These sensors need a supply of electrical power. This requires wiring and connectors, which can be troublesome particularly in a subsea environment. Also, they don't indicate whether the moving object is in an intermediate position between the open and closed position. Knowing the precise intermediate position would be advantageous in some instances, particularly with chokes, which are a type of valve for controlling flow rate.

SUMMARY OF THE INVENTION

In this invention, the sensor utilizes light transmitted remotely through fiber optic tubes. A plurality of input tubes have transmitting ends that are positioned in a holder mounted adjacent the moving device. The transmitting ends are positioned in a straight row that extends the full length of travel or stroke of the moving object. A light source transmits light through the input fiber optic tubes.

The moving object has a reflecting surface located across from the transmitting ends for reflecting any light transmitted through the input tubes. The width of the reflecting surface, measured along the path of travel, is selected so that it will reflect light from no more than a few of the input fiber optic tubes at one time.

A plurality of output fiber optic tubes are also mounted along the path. Each output tube has a receiving end that is located next to one of the transmitting ends of the input tubes. This optically couples each input tube to an output tube. Reflections from the reflecting surface of the movable object will reflect light through the output tubes. Each output tube has a display end which locates on a display board. When receiving reflected light, the display end will be illuminated, informing an inspector of the position of the moving object. In one embodiment, the display board is remotely located, preferably at the surface production platform. In another embodiment, the display board comprises a cover for the holder that holds the fiber optic tubes.

One embodiment is employed with a hydraulic actuator for a valve. The reflecting surface is located on an edge of the spring stop. In three other embodiments, the position sensor is used with a choke. In one of the choke embodiments, a plurality of sensor holders are employed, spaced circumferentially around a nonrotating stem of the choke. A plurality of reflecting strips are spaced in a circumferential array around the stem. The strips are staggered axially so that only one aligns at one time with one of the fiber optic tube transmitting ends.

In another embodiment for a choke, the stem rotates. The transmitting ends of the fiber optic tubes of the separate sensor holders are staggered. Only one of the fiber optic tube transmitting ends will align at any one time with the reflecting strip. Slight stem rotation causes the reflecting strip to move from alignment with one fiber optic tube of one sensor holder to a fiber optic tube of an adjacent sensor holder.

In another embodiment for a choke, the stem is nonrotating. A single sensor holder is employed. A single row of reflecting strips are positioned on the stem. The pitch between transmitting ends of the fiber optic tubes is different than the pitch between the reflecting strips. Only one transmitting end will align with a reflecting strip at one time.

DETAILED DESCRIPTION OF THE INVENTION

Figure 1:
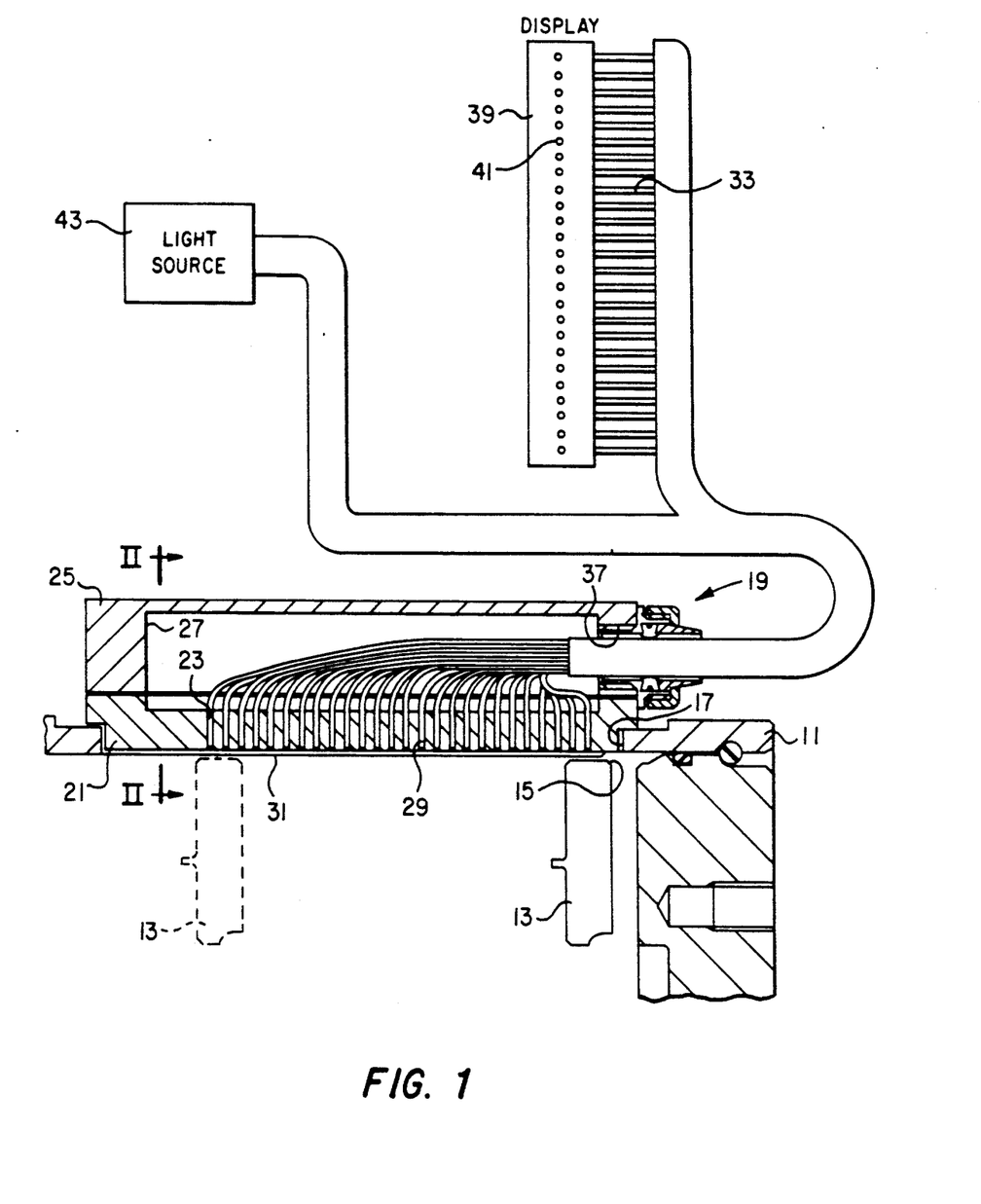
FIG. 1 is a vertical section view, partially schematic, of a sensor constructed in accordance with this invention.

Referring to FIG. 1, the well equipment which will utilize the sensor of this invention could be a variety of types, both subsea and surface, such as valves or chokes. In the embodiment of FIGS. 1-5, the sensor is used with a hydraulic actuator of a valve. The valve actuator includes a cylindrical housing 11. Housing 11 has a bore through which a movable object reciprocates, typically a spring stop ring 13.

Stop ring 13 will travel or stroke along a straight path between open and closed positions for the valve actuator. The fully closed position is the position shown on the right side by the solid lines. The fully open position is the position on the left side, shown by the dotted lines. Stop ring 13 is a cylindrical member, with a circular edge. The width of stop ring 13, from the forward side to the rearward side is much less than the length of travel from the open position to the closed position.

A light reflecting surface 15 locates on the circular edge of stop ring 13. Light reflecting surface 15 is in the embodiment shown, a shiny strip on the edge surface of stop ring 13. The width of reflecting surface 15, measured along the path of travel, is the distance between the forward and rearward sides of stop ring 13, and thus is much smaller than the length of travel between the open and closed positions. For example, the length of travel in one embodiment is 6.25 inches, while the width of light reflecting surface 15 is about one inch. Stop ring 13 has only a single light reflecting surface 15.

Housing 11 has an elongated slot or aperture 17, which is parallel to the longitudinal axis of housing 11. Aperture 17 extends the full length of travel of stop ring 13. A sensing unit 19 mounts to housing 11 over aperture 17. Sensing unit 19 has a holder 21, which is a rectangular housing. Holder 21 bolts to housing 11 and has a depending rectangular portion, shown in FIG. 2, that fits within aperture 17. Seals, not shown, will seal holder 21 to aperture 17 to prevent leakage into the bore of housing 11 when in a subsea well environment.

Figure 2:
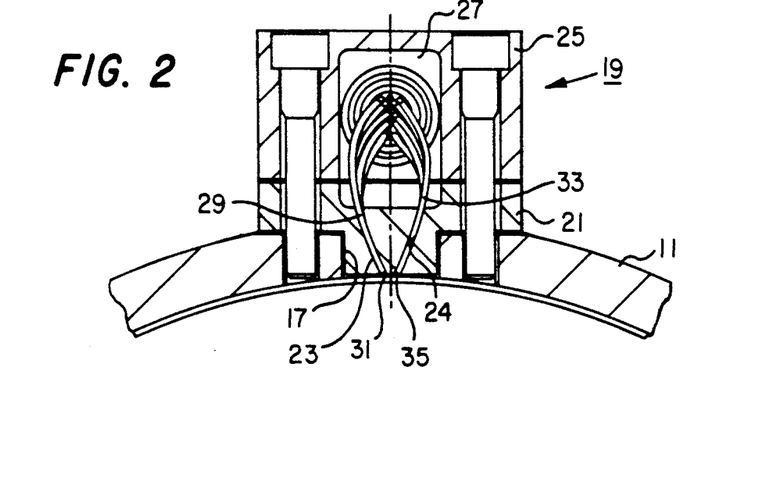
FIG. 2 is a sectional view of the sensor of FIG. 1, taken along the line II—II of FIG. 1.

As shown in FIGS. 1 and 2, a plurality of input holes 23 extend through the bottom of holder 21. Input holes 23 are evenly spaced apart from each other and extend along a straight line or row which is the full length of travel of the stroke of stop ring 13. When stop ring 13 is in the fully open position, the first input hole 23 will locate adjacent reflecting surface 15. When stop ring 13 is in the fully closed position, the last input hole 23 will locate adjacent reflecting surface 15. Input holes 23 are spaced apart from each other a distance that is less than the width of reflecting surface 15 but not significantly less than one-half the width of reflecting surface 15. As a result, preferably no more than two of the input holes 23 will be located across from reflecting surface 15 at one time. Preferably the spacing between input holes 23 is approximately one-half inch.

As shown in FIG. 2, a plurality of output holes 24 are also spaced along and extend through holder 21. Each output hole 24 is located very close to and almost touching one of the input holes 23. The spacing between and the number of output holes 24 is the same as the input holes 23. As shown in FIG. 2, the input and output holes 23, 24 are not located on a radial line emanating from the axis bore of housing 11. Rather the holes 23, 24 in each pair incline and converge toward each other. The lower ends of the holes 23, 24 are closer to each other than the upper ends of the holes 23, 24.

Referring again to FIG. 1, holder 21 has a cover 25, which fits sealingly over holder 21. Cover 25 and holder 21 define a cavity 27 therein. A plurality of input fiber optic tubes 29 extend into cavity 27. Each of the input fiber optic tubes 29 has a transmitting end 31 that extends through one of the input holes 23. Transmitting end 31 locates flush with the inside surface of holder 21, which is also flush with the bore of housing 11. Transmitting end 31 may comprise a collimating lens to emit substantially parallel rays.

A plurality of output fiber optic tubes 33 (FIG. 2) also extend into cavity 27. Each output fiber optic tube 33 has a receiving end 35 that extends into one of the output holes 24. Each receiving end 35 is also sealed in one of the holes 24 with its end flush with the inside surface of holder 21 and with the bore of housing 11. Also, each receiving end may comprises a collimating lens. Each input fiber optic tube 29 and each adjacent output fiber optic tube 33 make up an optical pair. If light from transmitting end 31 strikes light reflecting portion 15, it will reflect back into receiving end 35 of its pair.

The fiber optic tubes 29, 33 are secured in a bundle and extend through a sealed port 37 in cover 25. In the embodiment of FIG. 1, the bundle of fiber optic tubes 29, 33 extends to a remotely located display board 39. For example, housing 11 may be located subsea, while display board 39 is located at the surface on a production platform.

Each of the output fiber optic tubes 33 has a display end 41. The display ends 41 are arranged in a row. A display end 41 will illuminate if reflected light is received in the receiving end 35 of the fiber optic tube 33. If necessary, a conventional light amplifier could be employed to brighten the illumination of the display ends 41. This could also include an optical electrical converter. A conventional light source 43, shown schematically, applies a beam of light simultaneously to all of the input fiber optic tubes 29. Light source 43 will also be located remotely from the housing 11 in this embodiment.

In the operation of the embodiment of FIGS. 1 and 2, light source 43 transmits light simultaneously to all of the input fiber optic tubes 29. If stop ring 13 is positioned in alignment with one or more of the transmitting ends 31, the light will reflect off light reflecting portion 15. This light will be received by the receiving ends 35 of the adjacent output fiber optic tubes 33. The reflected light transmits through the output fiber optic tubes 33 and illuminates the display ends 41. No reflected light will be received from any of the output fiber optic tubes 33 that are not located across from light reflecting portion 15. As the stop ring 13 moves from right to left, different display ends 41 will illuminate, illustrating the full stroke of stop ring 13. No more than two or three of the display ends 41 will illuminate at any time.

Figure 3:
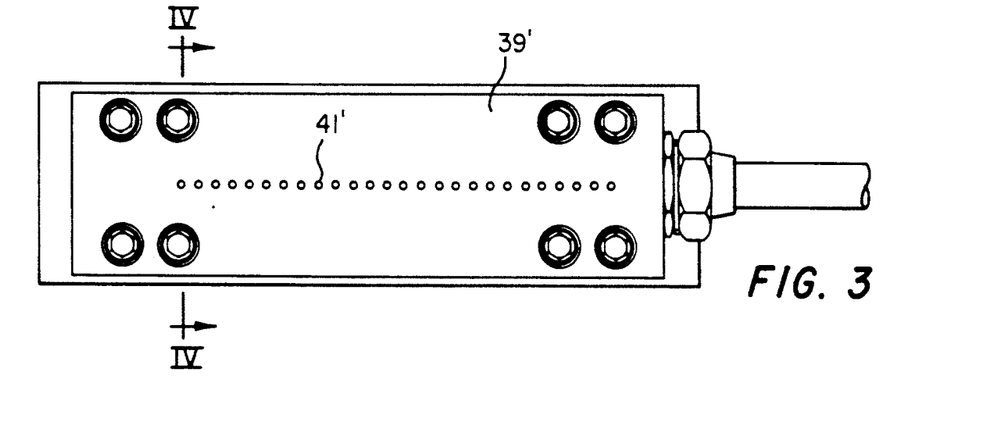
FIG. 3 is a top plan view of a first alternate embodiment of the sensor of FIG. 1.
Figure 4:
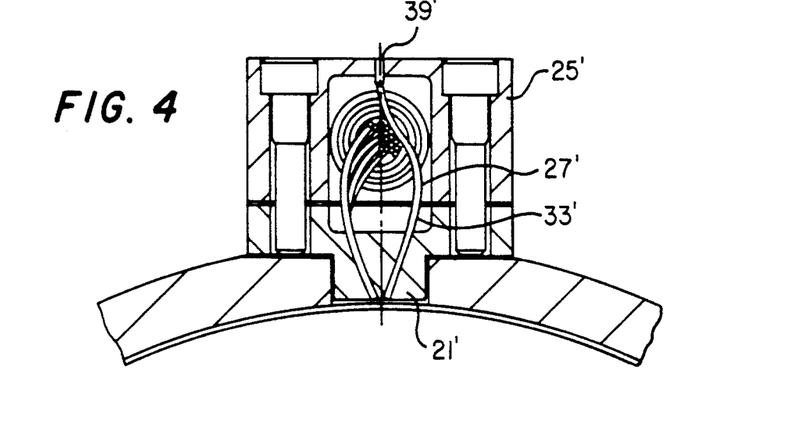
FIG. 4 is a sectional view of the sensor of FIG. 3, taken along the line IV—IV of FIG. 3.

FIGS. 3 and 4 illustrate an alternate location for the display board 39. In this embodiment, the display ends 41' do not extend remotely to a display 39. Rather, the display ends 41' are located in the top of the cover 25' which serves as a display board. Display ends 41' will be in a row which extends the full length of travel of the stop ring 13 (FIG. 1). The output fiber optic tubes 33' are short, extending from the interior side of holder 21' through the cavity 27' and to the cover 25'. The embodiment of FIGS. 3 and 4 could be inspected by a diver if located subsea. Alternately, the sensing device illustrated in FIGS. 3 and 4 could be employed where housing 11 is located at the surface available for visual inspection.

Figure 5:
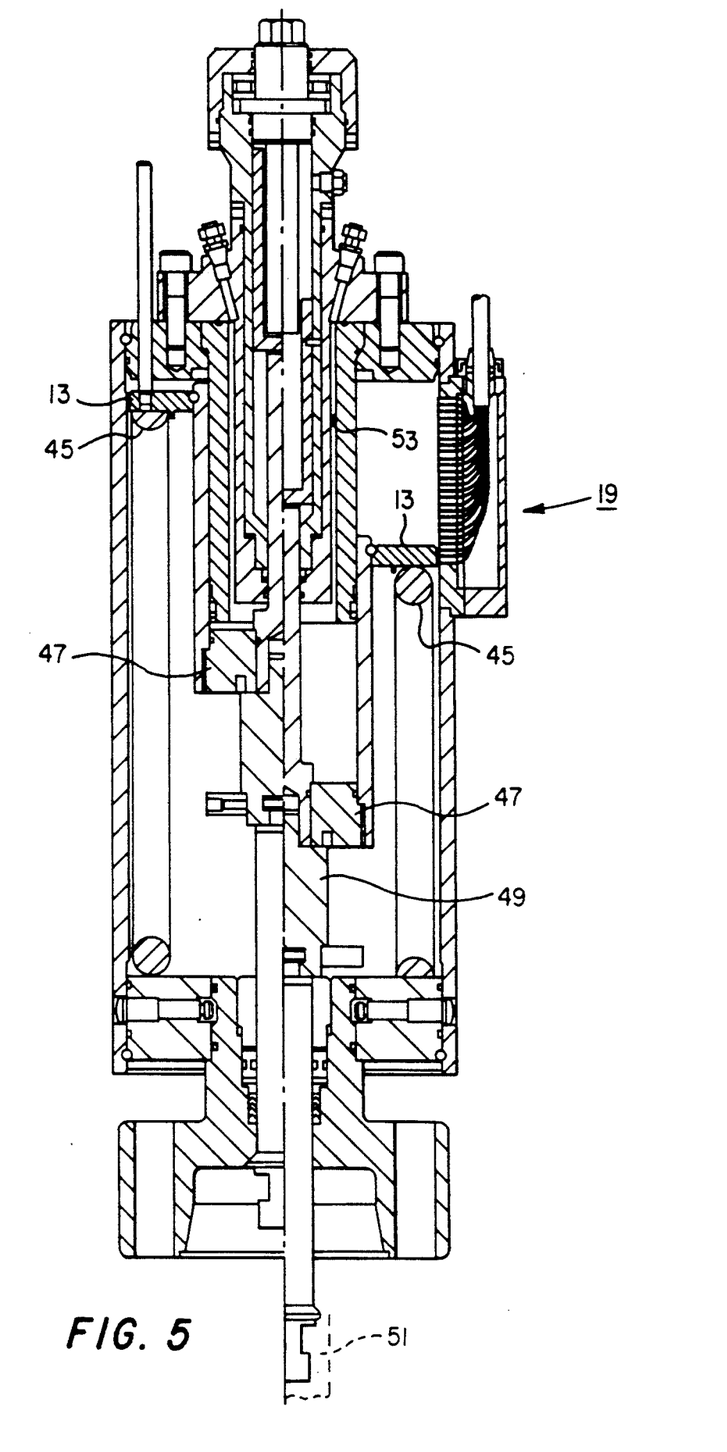
FIG. 5 is a sectional view of the sensor of FIG. 1 shown installed on a hydraulic actuator portion of a valve.

FIG. 5 illustrates more details of the hydraulic actuator, which may be conventional but for the installation of aperture 17. The right side shows stop ring 13 with the actuator in an open position, while the left side shows stop ring 13 with the actuator in a closed position. Stop ring 13 is a retainer ring for a coil spring or other spring member 45. Stop ring 13 is connected to a piston 47, which in turn is connected to a stem 49, such that stop ring 13 will move with movement of stem 49. Stem 49 will move along the longitudinal axis of housing 11 to open and close a gate 51, shown by dotted lines. Gate 51 will open and close flow passages (not shown). A hydraulic passage 53 supplies hydraulic fluid to piston 47, which will move stop ring 13 downward, compressing coil spring 45 to open the gate 51. On release of hydraulic pressure, coil spring 45 pushes stop ring 13 back to the upper closed position.

Figure 6:
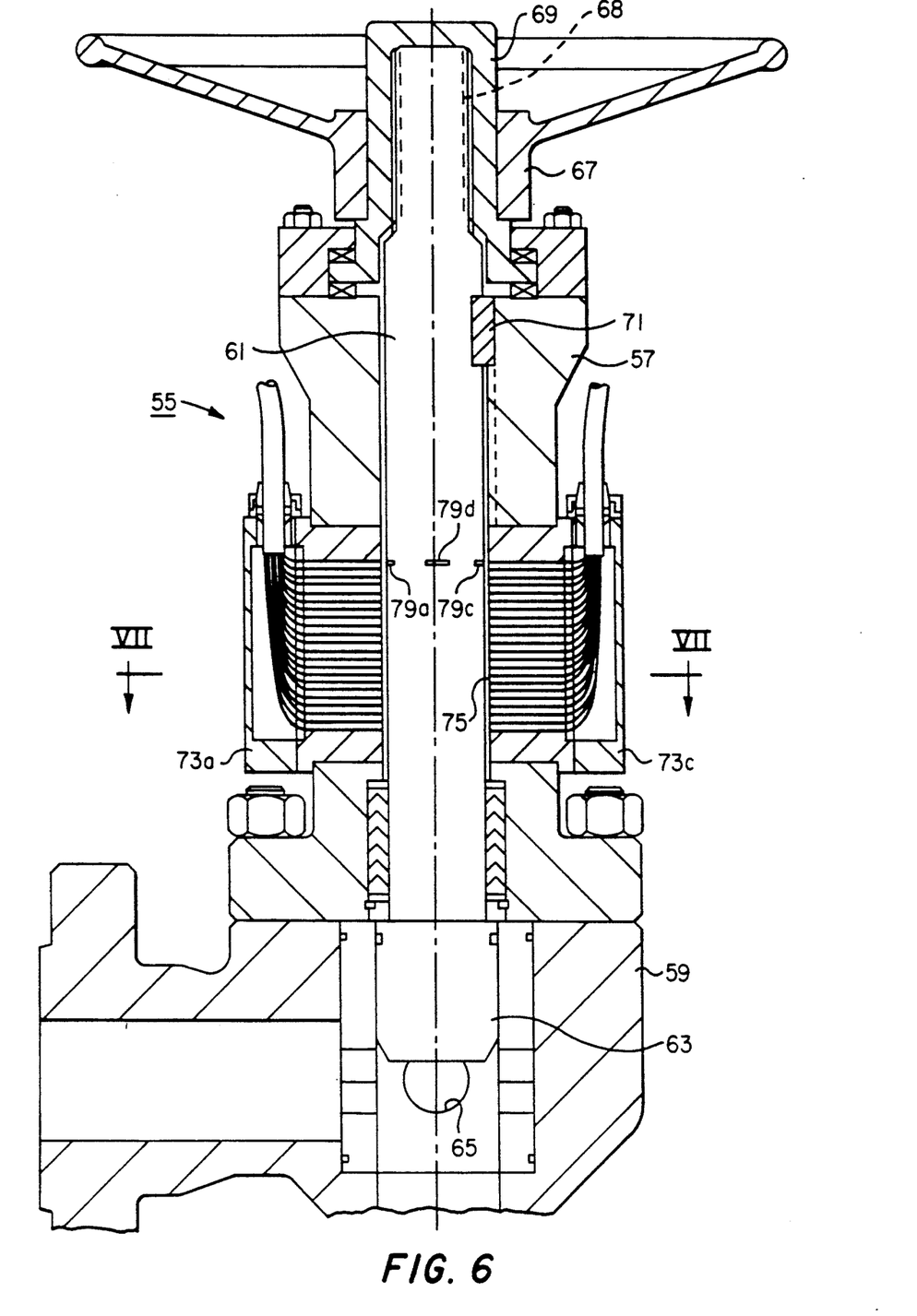
FIG. 6 is a sectional view of a second alternate embodiment of the sensor of FIG. 1, showing a plurality of the sensors installed on a choke which has a nonrotating stem.
Figures 7, 8:
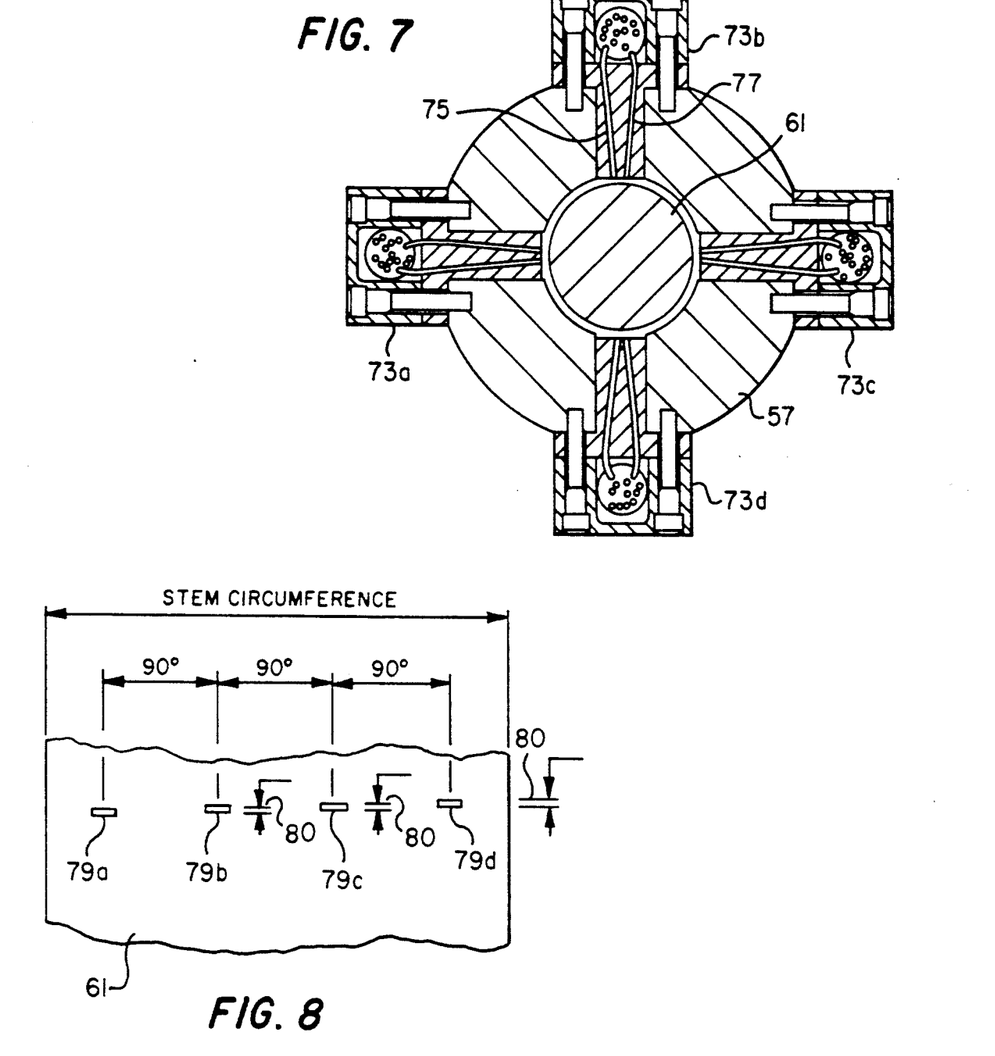
FIG. 7 is a sectional view of the sensor of FIG. 6, taken along the line VII—VII of FIG. 6.
FIG. 8 is a schematic view of a portion of the stem of the choke of FIG. 6, showing the spacing of the reflecting strips.

FIGS. 6-8 illustrate this invention applied to a choke 55. Choke 55 is a type of valve used in oil production to control flow rates. Choke 55 has a cylindrical housing 57 that mounts to a body 59. A stem 61 extends through housing 57 along the longitudinal axis. Stem 61 has a blocking member 63, similar to a throttle or gate, on its lower end that will block flow passages 65 extending through body 59. Blocking member 63 will be positioned at various partial blocking positions to restrict the flow of fluid to achieve the desired pressure.

A handle 67 when rotated will move stem 61 axially. In the embodiment of FIGS. 6-8, handle 67 rotates an internally threaded nut 69. The internally threaded nut 69 engages threads 68 on the upper end of stem 61 to cause it to move up and down. In the embodiment shown, key 71 prevents stem 61 from rotating relative to housing 57.

The precise position of blocking member 63 is very important in connection with choke 55. As little as a quarter turn can have a significant impact on the amount of restriction of flow passages 65. To precisely measure the position of blocking member 63, a plurality of holders 73 are employed.

As shown in FIG. 7, in this embodiment, four separate holders 73a, b, c, d (FIG. 7) are employed, each located 90 degrees apart from the other, spaced circumferentially around housing 57. Each holder 73 has a portion which sealingly inserts within an elongated aperture or slot in housing 57. A plurality of input fiber optic tubes 75 extend through each holder 73. Similarly, a plurality of output fiber optic tubes 77 extend into each holder 73. The holders 73 are all arranged at the same axial distance from blocking element 63. Consequently, each fiber optic tube pair 75, 77 will be located in a radial plane with a similar pair in all of the other holders 73. The axial distance between each fiber optic tube pair 75, 77 is preferably the same as the pitch of threads 68.

Stem 61 has an exterior that is coated or otherwise formed so that it will not reflect. Rather, four reflecting strips 79a, b, c, and d, shown in FIG. 8, are employed. Reflecting strips 79 are small shiny rectangular bands secured to stem 61. Centers of the reflecting strips 79 are spaced 90 degrees apart, and each strip extends short circumferential distances. As stem 61 does not rotate, each reflecting strip 79 will always be located in alignment with the row of fiber optic tubes 75, 77 of one of the holders 73. For example, reflecting strip 79a will always be in alignment with the row of fiber optic tubes 75, 77 of holder 73a. Reflecting strips 79 are not located in a single radial plane of the axis of stem 61. Rather, they are axially staggered, so that each is located at a different axial distance from blocking member 63 (FIG. 1) than the others. Reflecting strip 79b is located an increment 80 above reflecting strip 79a. Reflecting strip 79c is located an increment 80 above reflecting strip 79b. Reflecting strip 79d is located an increment 80 above reflecting strip 79c. Increments 80 are identical to each other, each preferably representing one-fourth of the pitch of threads 68, which is also the axial distance between the fiber optic tube 75, 77 of each holder 73.

In the operation of the embodiment of FIGS. 6-8, light will be simultaneously transmitted through all of the input fiber optic tubes 75. Because of the axial staggering of the reflecting strips 79a, b, c, and d, only one of the reflecting strips 79 will be located directly across from one of the input fiber optic tubes 75 at any time. The light passing through that fiber optic tube 75 will reflect off the reflecting strip 79 and be received by the adjacent output fiber optic tube 77. That light transmits to a display such as display board 39 in FIG. 1. For example, if reflecting strip 79a is precisely aligned with one of the fiber optic tube pairs 75, 77 of holder 73a, one and only one of the display ends of the fiber optic tubes 77 will illuminate. Because of the axial staggering of reflecting strips 79, the reflecting strips 79b, c, and d will not be precisely across from any of the fiber optic tube pairs 75, 77 of holders 73b, c and d and no display ends from these holders will be illuminated.

If the operator rotates the handle 67 one fourth turn from the example above, the stem 61 will move nonrotatably downward a short axial distance, causing blocking element 63 to further block passage 65. When this occurs, the output fiber optic tube 77 of holder 73a that previously was receiving reflected light from reflecting strip 79a will no longer receive such reflected light. Instead, one quarter of a turn of the handle 67 will cause the next reflecting strip 79b to align with a pair of input and output fiber optic tubes 75, 77 of holder 73b. A display end of a fiber optic tube pair 75, 77 of holder 73b will illuminate.

Similarly, another quarter turn advancement will cause reflecting strip 79b to pass out of registry, and reflecting strip 79c to align with a fiber optic pair 75, 77 of holder 73c. The third quarter turn will cause registry of a fiber optic pair 75, 77 of holder 73d with reflecting strip 79d. Then, an additional quarter turn will again align reflecting strip 79a with a fiber optic pair 75, 77 in holder 73a. However, the fiber optic pair 75, 77 will be the next lower from the one which registered as previously discussed above. By making the pitch between pairs of fiber optic tubes 75, 77 in each holder 73 equal to the pitch of the threads 68, typically in the range of ⅛ inch to ¼ inch, increments of one-fourth turn can be precisely measured. Furthermore, additional holders 73 more than four will increase the accuracy of the measurement.

Figure 9:
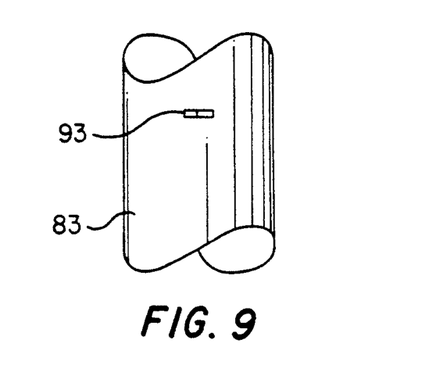
FIG. 9 is a partial front view of the stem employed in the embodiment shown in FIG. 10.
Figures 10, 11:
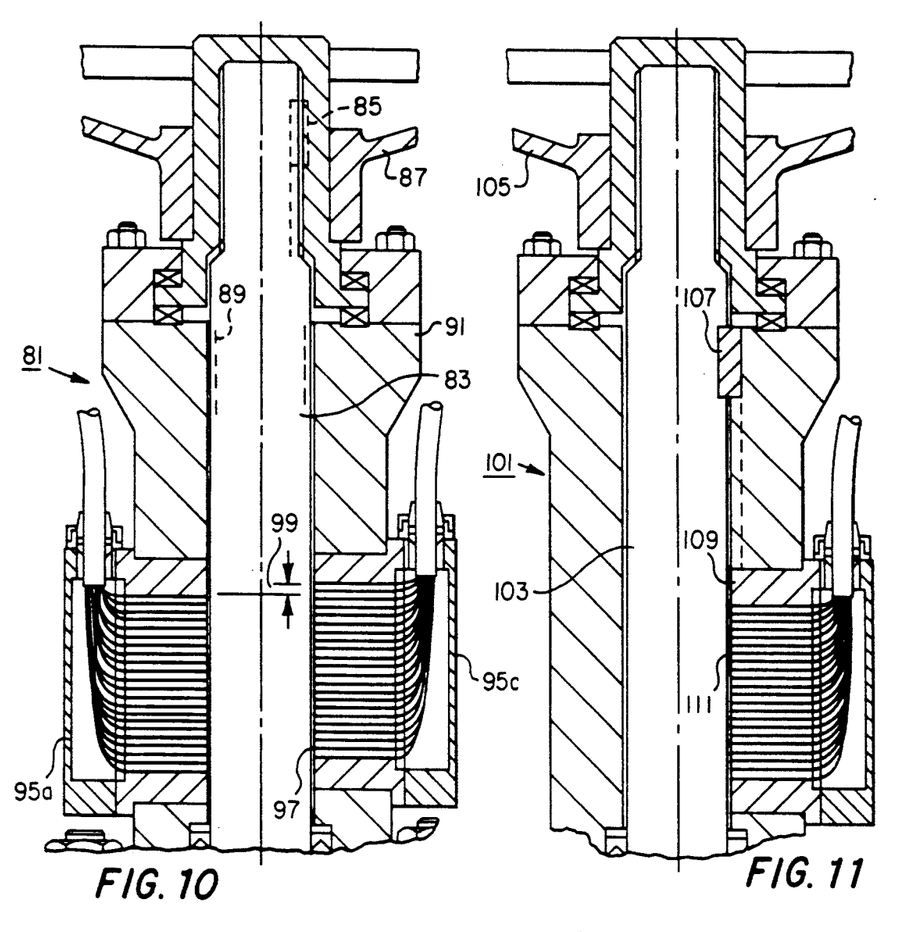
FIG. 10 is partial sectional view of a fourth embodiment, showing a plurality of the sensors installed on a choke which has a rotating stem.
FIG. 11 is a partial sectional view of a fifth embodiment, showing a single sensor installed on a choke which has a nonrotating stem.

FIGS. 9 and 10 illustrate a choke 81, which differs from choke 55 of FIG. 6 in that stem 83 rotates. A key 85 causes stem 83 to rotate with handle 87. Threads 89 in the housing 91 cause stem 83 to advance axially when handle 87 is rotated.

A single reflecting strip 93 (FIG. 9) will be located on stem 83. Reflecting strip 93 is a small rectangular strip, similar to reflecting strip 79 (FIG. 8). Preferably four holders 95 are employed. Only two holders 95 are shown, these being indicated by the numerals 95a, 95c. Each holder 95a, c has a plurality of fiber optic tube pairs 97, each pair 97 having an input and output fiber optic tube as previously discussed. The holders 95a, c are axially staggered relative to each other. That is, the fiber optic tube pairs 97 of holder 95a will be an increment 99 offset from the fiber optic tube pairs 97 of the holders 95 spaced 90 degrees away. Fiber optic tube pairs 97 will not be in the same radial plane. Preferably, the increment 99 relates to the pitch of threads 89 (typically in the range of ⅛ inch to ¼ inch). That is, if four holders 95 are employed, increment 99 is equal to one-fourth of the pitch of threads 89 (for example, 1/32 inch to 1/16 inch). Only one of the fiber optic tube pairs 97 will register with reflecting strip 93 at one time.

In the operation of the embodiments of FIGS. 9 and 10, light is transmitted through the fiber optic pairs 97 and received if one of the fiber optic tube pairs 97 of all of the holders 95 is in precise alignment with reflecting strip 93. For example, reflecting strip 93 might be in registry with a fiber optic tube pair 97 of holder 95a. This will cause an illumination at a display (not shown). Rotating one-fourth turn causes the reflecting strip 93 to rotate and align with a fiber optic tube pair 97 of a holder 95 that is located 90 degrees from the previous holder. This will cause an illumination at a display. Rotating stem 83 another quarter turn will cause reflecting strip 93 to align with a fiber optic tube pair 97 of holder 95c. A full turn from the first position will result in a fiber optic tube pair 97 of holder 95a again registering with reflecting strip 93. In this manner, increments of one-fourth turn are precisely measured if four holders 95 are employed.

Figure 12:
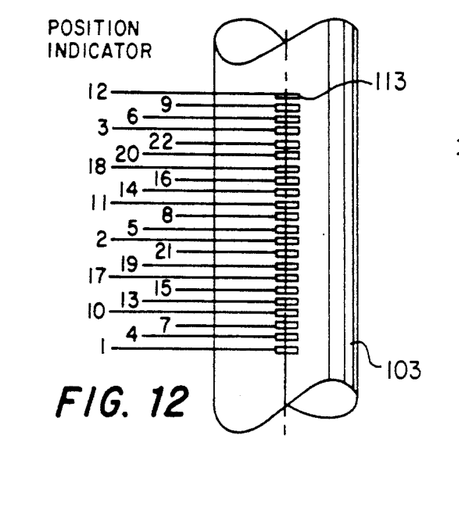
FIG. 12 is a partial front view of the stem employed in the embodiment shown in FIG. 11.
Figure 13:
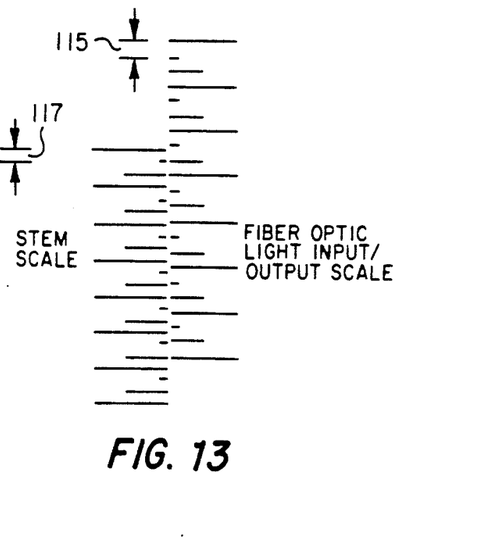
FIG. 13 is a schematic comparison of the pitches of the reflecting strips on the stem of FIG. 12 and the fiber optic tube transmitting ends of the sensor of FIG. 11.

FIGS. 11-13 illustrate another embodiment for a choke 101. Choke 101 employs a stem 103 that is nonrotating, and moves axially in the same manner as stem 61 of FIG. 6. The axial movement is caused by handle 105 in the same manner as handle 67 at FIG. 6. A key 107 prevents rotation of stem 103. In this embodiment, a single holder 109 is employed. Holder 109 has a portion which extends through an aperture in the housing of choke 101. Holder 109 has a row of fiber optic tube pairs 111, each pair having an input and an output tube. Each fiber optic tube pair 111 is axially spaced from adjacent pairs by a selected pitch 115 (FIG. 13).

A row of reflecting strips 113 are placed on stem 103. The reflecting strips 113 are aligned with and always face the holder 109. The spacing or pitch 115 between each reflecting strip 113 is illustrated in FIG. 13. Pitch 117 differs from the pitch 115 between each fiber optic tube pair 111, and is less in the embodiment shown.

The differences in pitch 115, 117 is selected so that only one reflecting strip 113 will align with one of the fiber optic tube pairs 111 at any particular instance. As indicated by the numerals shown in FIG. 12, the strips 113 will align in the order shown, with the strip 113 indicated by the numeral 2 aligning just after the strip 113 indicated by the numeral 1 aligns. For example, one alignment results in the lowermost reflecting strip 113, indicated by the numeral 1, being in alignment with a fiber optic tube pair 111. Rotating handle 115 less than one turn will cause the stem 103 to advance downward. The reflecting strip 113 indicated by the numeral 1 will no longer register a fiber optic tube pair 111. Rather, the difference in pitch is selected so that the reflecting strip indicated by the numeral 2 will align with one of the fiber optic tube pairs 111. Note that the strip 113 indicated by the numeral 2 is not adjacent the strip 113 indicated by the numeral 1, rather, it is the next strip which will align with one of the fiber optic tube pairs. Then, continued rotation will cause the strip 113 illustrated by the numeral 3 to align with one the fiber optic tube pairs 111. The reflecting strip 113 indicated by the numeral 3 is same multiple of the pitch as the strip 113 indicated by the numeral 2, which in this instance is nine times. Continued advancement will cause the reflecting strip indicated by the numeral 4 to align with one of the fiber optic tube pairs 111. Similarly, the reflecting strip indicated by the numeral 5 will then align. The reflecting strip indicated by the numeral 4 is located directly above the reflecting strip 113 indicated by the numeral 1. The reflecting strip indicated by the numeral 5 is the same distance above the reflecting strip 113 indicated by the numeral 4 as the distance between the first reflecting strip 113 and the one indicated by the numeral 2. This distance is nine times the pitch.

The display ends (not shown) of the output fiber optic tubes of each pair 111 will be arranged sequentially, so that the sequential travel will be indicated by the display (not shown). That is, the display end of the fiber optic tube pair 111 which illuminates when the reflecting strip 113 indicated by the numeral 2 registers will be located directly adjacent the display end that illuminates when the strip indicated by the numeral 1 is in alignment. The differences in pitch 115, 117 are selected so that only one alignment will occur at any particular time, based on the particular diameters of the ends of the optic tube pairs 111 and the desired sensitivity.

The invention has significant advantages. The fiber optic tube positioner indicates the position of a moving object moving along a linear path. Intermediate positions between fully open and fully closed are readily detected. The display can be either remote or located at the sensor. The device is readily adaptable to but not limited to valve actuators or chokes. It provides accuracy of a fraction of turn for chokes. It is workable both for rotating and nonrotating stems.

While the invention has been shown in only five of its forms, it should be apparent to those skilled in the art that it is not so limited but is susceptible to various changes without departing from the scope of the invention.

I claim:

1. In an apparatus having an object that moves along a linear path of a selected length, the object being located at least in part within a housing, an improved means for sensing the position of the object along the linear path, comprising in combination:

an elongated aperture in the housing adjacent the linear path;

a holder;

a plurality of input fiber optic tubes extending to the holder, the input fiber optic tubes having transmitting ends mounted to the holder, spaced apart from each other and arranged in a straight line which has a length that is at least a substantial portion of the length of the linear path, the spacing between each of the transmitting ends being substantially less than the length of the linear path;

means or mounting the holder to the housing at least in part within the aperture adjacent the object with the transmitting ends being substantially perpendicular to the linear path;

light source means for transmitting light through the input fiber optic tubes;

light reflecting means on the object, including at least one light reflecting portion hat moves with the object, for reflecting light from the light source means passing through each of the transmitting ends when the light reflecting portion is facing and directly across from the each of the transmitting ends, the light reflecting portion of the object being of a length substantially less than the length of the linear path, measured parallel to the linear path, such that the light reflecting portion will reflect light from no more than a small portion of the transmitting ends at one time; and output means incorporated with each of the transmitting ends of the input fiber optic tubes for receiving reflected light from the light source means which is reflected from the reflecting portion of the object, and for transmitting the reflected light to a display to indicate the position of the object along the linear path.

2. The apparatus according to claim 1 wherein the output means comprises:
- a plurality of output fiber optic tubes;
- coupling means for optically coupling each of the output fiber optic tubes to one of the input fiber optic tubes so as to receive any reflected light from each of the transmitting means; and
- a display end on each of the output fiber optic tubes mounted to the display, the display ends illuminating if reflected light is being received.

3. The apparatus according to claim 1 wherein the output means comprises:
- a plurality of output fiber optic tubes;
- coupling means for optically coupling each of the output fiber optic tubes to one of the input fiber optic tubes so as to receive any reflected light from each of the transmitting ends;
- a display end on each of the output fiber optic tubes mounted to the display, the display ends illuminating if reflected light is being received; and wherein the display is remotely located from the holder.

4. The apparatus according to claim 1 further comprising:
- a cover mounted over the holder and defining a cavity, wherein the input fiber optic tubes extend through the cover into the cavity, 5. In a valve assembly having a housing with a flow passage, a non-rotating stem having an axis, a gate which moves in a linear path across the flow passage in response to axial movement of the stem to block flow through the flow passage, the improvement being a position sensor for sensing the position of the gate along the linear path, comprising in combination:
- a coil spring which urges the gate to a closed position, the coil spring being retained by a spring stop ring which has a circular edge;
- a light reflecting portion mounted on the edge of the stop ring for movement with the stem, the light reflecting portion of the object being of a length substantially less than the length of the linear path, measured parallel to the linear path;
- at least one holder;
- a plurality of input fiber optic tubes extending to the holder, the input fiber optic tubes having transmitting ends mounted to the holder, spaced apart from each other at a selected pitch and arranged in a straight line which has a length that substantially equals the length of the linear path, the pitch between each of the transmitting ends being substantially less than the length of the linear path;
- mounting means for mounting the holder to the housing with the transmitting ends being pointed toward the linear path;
- light source means for transmitting light through the input fiber optic tubes;
- a plurality of output fiber optic tubes;
- coupling means for optically coupling each of the output fiber optic tubes to one of the input fiber optic tubes so as to receive any reflected light transmitted through the input fiber optic tubes and reflected from the light reflecting portion into each of the output fiber optical tubes;
- a display board; and
- a display end on each of the output fiber optic tubes mounted to the display board, each of the display ends illuminating if reflected light is being received to indicate the position of the gate.

6. The valve assembly according to claim 5 wherein the display board is remotely located from the holder.

7. The valve assembly according to claim 5 wherein the display board is mounted to the holder.

8. The valve assembly according to claim 5 wherein the coupling means comprises:
- a receiving end on each of the output fiber optic tubes; and
- means for mounting each of the receiving ends adjacent one of the transmitting ends for receiving light reflected form the light reflecting portion.

9. The valve assembly according to claim 5 further comprising an elongated aperture and wherein the holder is mounted at least in part within the aperture.

10. The valve assembly according to claim 5 further comprising:
- an elongated aperture wherein the holder is mounted at least in part within the aperture
- a cover mounted over the holder and defining a cavity; and
- a port connecting an interior of the cavity with an exterior of the cavity, and wherein the input and output fiber optic tubes extend through the port into the cavity.

11. In a valve assembly having a housing, a nonrotating stem having an axis and which moves along a linear path of a selected length to open and close the valve assembly, a coil spring which is carried in the housing for urging the stem to a closed position, a spring stop ring mounted to the stem for movement therewith along the linear path and for retaining the coil spring in a compressed state, the improvement being a position sensor for sensing the position of the stop ring along the linear path, comprising in combination;
- a holder;
- a plurality to input fiber optic tubes extending to the holder, the input fiber optic tubes having transmitting ends mounted to the holder, spaced apart from and arrange along a straight line;
- an elongated aperture in the housing adjacent the linear path;
- means for mounting the holder to the housing over the aperture with the straight line of the transmitting ends being parallel to the axis and with the transmitting ends of the fiber optic tubes pointed toward the linear path;
- light source means for transmitting light through the input fiber optic tubes;
- a light reflecting portion on an edge of the stop ring for reflecting light transmitted through the input fiber optic tubes;
- a plurality of output fiber optic tubes arranged along a straight line adjacent the transmitting ends of the input fiber optic tubes;
- coupling means for coupling each of the output fiber optic tubes to ne of the input fiber optic tubes so as to receive any reflected light from the light reflecting portion;
- a display board;
- a display end on each of the output fiber optic tubes mounted to the display board, the display ends being arranged along a line that corresponds to the arrangement of the input and output fiber optic tubes, each of the display ends illuminating if reflected light is being received to indicate the position of the stop ring;

the holder being mounted at least partly in the elongated aperture;

a cover mounted over the holder and defining a cavity; and a port connecting an interior of the cavity with an exterior of the cavity, the input and output fiber optic tubes extending through the port into the interior of the cavity.

12. The valve assembly according to claim 11 wherein the display board is remotely located from the holder.

13. The valve assembly according to claim 11 wherein the display board is mounted to the holder.

14. The valve assembly according to claim 11 wherein the coupling means comprises:

a receiving end on each of the output fiber optic tubes; and means for mounting each receiving end adjacent one of the transmitting ends.

15. The valve assembly according to claim 11 wherein the transmitting ends are spaced apart from each other at a pitch that is selected to be substantially less than the length of the linear path.

16. In a valve assembly having a housing, a nonrotating stem having an axis and which moves along a linear path of a selected length to open and close the valve assembly, the improvement being a position sensor for sensing the axial position of the stem along the linear path, comprising in combination:

a plurality of holders;

a plurality of input fiber optic tubes extending to one of the holders, the input fiber optic tubes having transmitting ends mounted to the holder, spaced apart from each other and arranged along a straight line;

a plurality of elongated apertures in the housing, spaced circumferentially around and parallel to the axis of the stem;

means for mounting each of the holders to the housing over one of the apertures with the transmitting ends of the fiber optic tubes pointed toward the stem, each of the transmitting ends being in the same radial plane of the axis as one of the transmitting ends of the input fiber optic tubes of the other holders;

light source means for transmitting light through the input fiber optic tubes;

a plurality of reflecting strips located on and spaced circumferentially around the stem so that each reflecting strip aligns with one of the apertures, each of the reflecting strips being located at a different axial distance on the stem than the other such that only one of the reflecting strips will align with and reflect light back from one of the transmitting ends at one time;

a plurality of output fiber optic tubes mounted to each of the holders;

coupling means for coupling each of the output fiber optic tubes to one of the input fiber optic tubes so as to receive any reflected light from the reflecting strips;

a display board; and a display end on each of the output fiber optic tubes mounted to the display board, each of the display ends illuminating if reflected light is being received to indicate the position of the stem.

17. The valve assembly according to claim 16 wherein the display board is remotely located from the holder.

18. The valve assembly according to claim 16 wherein the display board is mounted to the holder.

19. The valve assembly according to claim 16 wherein the coupling means comprises:

a receiving end on each of the output fiber optic tubes; and means for mounting each receiving end adjacent one of the transmitting ends.

20. In a valve assembly having a housing, a rotating stem having an axis and which moves along a linear path of a selected length to open and close the valve assembly, the improvement being a position sensor for sensing the axial position of the stem along the linear path, comprising in combination:

a plurality of holders;

a plurality of input fiber optic tubes extending to each of the holders, the input fiber optic tubes having transmitting ends mounted to the holder, spaced apart from each other and arranged along a straight line;

a plurality of elongated apertures in the housing, spaced circumferentially around and parallel to the axis of the stem;

means for mounting each of the holders to the housing over one of the apertures with the transmitting ends of the fiber optic tubes pointed toward the stem and with each transmitting end being staggered in a different radial plane from the transmitting ends of the input fiber optic tubes of the other holders;

light source means for transmitting light through the input fiber optic tubes;

a single reflecting strip located on the stem so as to reflect light from only one of the transmitting ends of the fiber optic tubes at one time;

a plurality of output fiber optic tubes mounted to each of the holders;

coupling means for coupling each of the output fiber optic tubes to one of the input fiber optic tubes so as to receive any reflected light from the reflecting strip;

a display board; and a display end on each of the output fiber optic tubes mounted to the display board, each of the display ends illuminating if reflected light is being received to indicate the position of the stem.

21. The valve assembly according to claim 20 wherein the display board is remotely located from the holder.

22. The valve assembly according to claim 20 wherein the display board is mounted to the holder.

23. The valve assembly according to claim 20 wherein the coupling means comprises:

a receiving end on each of the output fiber optic tubes; and means for mounting each receiving end adjacent one of the transmitting ends.

24. In a valve assembly having a housing, a nonrotating stem having an axis and which moves along a linear path of a selected length to open and close the valve assembly, the improvement being a position sensor for sensing the axial position of the stem along the linear path, comprising in combination:

a holder;

a plurality of input fiber optic tubes extending to the holder, the input fiber optic tubes having transmitting ends mounted to the holder, spaced apart from each other at a selected pitch and arranged along a straight line;

an elongated aperture in the housing, extending parallel to the axis of the stem;

means for mounting the holder to the housing over the aperture with the transmitting ends of the fiber optic tubes pointed toward the stem;

light source means for transmitting light through the input fiber optic tubes;

a plurality of reflecting strips located on the stem and spaced axially apart from each other at a pitch that differs from the pitch of the transmitting ends, the difference in pitch being selected so that only one of the reflecting strips aligns with and reflects light back from one of the transmitting ends at one time;

a plurality of output fiber optic tubes mounted to each of the holders;

coupling means for coupling each of the output fiber optic tubes to one of the input fiber optic tubes so as to receive any reflected light from the reflecting strips;

a display board; and a display end on each of the output fiber optic tubes mounted to the display board, each of the display ends illuminating if reflected light is being received to indicate the position of the stem.

25. The valve assembly according to claim 24 wherein the display board is remotely located from the holder.

26. The valve assembly according to claim 24 wherein the display board is mounted to the holder.

27. The valve assembly according to claim 24 wherein the coupling means comprises:

a receiving end on each of the output fiber optic tubes; and means for mounting each receiving end adjacent one of the transmitting ends.

28. A method for sensing the position of an object which moves along a linear path, the object being located at least in part within a housing, comprising in combination:

providing an elongated aperture in the housing adjacent the linear path;

mounting a plurality of input fiber optic tubes to a holder, with the input fiber optic tubes each having a transmitting ends mounted to the holder, spaced apart from each other and arranged along a straight line which has a length that is at least a substantial portion of the length of the linear path;

mounting the holder to the housing at least in part within the aperture adjacent the object with the straight line of the transmitting ends being parallel to the linear path and with the transmitting ends of the fiber optic tubes pointed toward the linear path;

providing the object with alight reflecting portion which has a length substantially less than the length of the linear path;

transmitting light through the input fiber optic tubes;

reflecting light passing through the transmitting ends, but only light passing through the transmitting ends that are facing and directly across from the light reflecting portion, so that no light will be reflected by the light reflecting portion from transmitting ends that are not facing and directly across from the object due to the current position of the object, so that the light reflecting portion will reflect light from no more than a small portion of the transmitting ends at one time; and receiving reflected light which is reflected from the reflecting portion of the object, and transmitting the reflected light to a display to indicate the position of the object along the linear path.

29. The method according to claim 28, wherein the step of transmitting the reflected light to a display comprises coupling an output fiber optic tube to each of the input fiber optic tubes, mounting a display end to each of the output fiber optic tubes to the display, receiving any reflected light in the output fiber optic tubes and illuminating the display end of each of the output fiber optic tubes receiving reflected light.

30. The method according to claim 28 wherein the step of transmitting any reflected light to a display comprises mounting the display remotely from the holder.

31. The method according to claim 28 wherein the step of transmitting any reflected light to a display comprises mounting the display to the holder.

* * * * *

UNITED STATES PATENT AND TRADEMARK OFFICE
CERTIFICATE OF CORRECTION

PATENT NO. : 5,331,152

DATED : July 19, 1994

INVENTOR(S) : Stephen P. Fenton

It is certified that error appears in the above-identified patent and that said Letters Patent is hereby corrected as shown below:

Column 8, line 54, "hat" should be --that--;
Column 9, line 41, please delete "of the object";

Column 10, line 58, "ne of the" should be --one of the--;
Column 14, line 5, "a transmitting ends" should be --a transmitting end--; and
Column 14, line 14, "alight" should be --a light--.

Signed and Sealed this

Twenty-eight Day of February, 1995

Attest:

BRUCE LEHMAN

*Attesting Officer*  *Commissioner of Patents and Trademarks*